United States Patent [19]

Tresouthick

[11] 3,961,974

[45] June 8, 1976

[54] METHOD OF MANUFACTURE OF IMPROVED WHITE PORTLAND CEMENT

[75] Inventor: Stewart W. Tresouthick, North Township, Lake County, Ind.

[73] Assignee: United States Steel Corporation, Pittsburgh, Pa.

[22] Filed: Apr. 15, 1975

[21] Appl. No.: 568,335

[52] U.S. Cl. .............................. 106/101; 106/102; 264/117; 432/13
[51] Int. Cl.² ........................................ C04B 7/08
[58] Field of Search .............. 106/101, 102; 432/13, 432/14; 264/117

[56] References Cited
UNITED STATES PATENTS

| | | | |
|---|---|---|---|
| 2,769,719 | 11/1956 | Devaney | 432/13 X |
| 2,945,688 | 7/1960 | Pajenkamp et al. | 106/101 |
| 3,085,022 | 4/1963 | Koch | 106/101 |
| 3,425,853 | 2/1969 | Rives | 106/101 |
| 3,595,543 | 7/1971 | Tresouthick | 106/101 X |
| 3,799,785 | 3/1974 | Tanner | 106/101 |

FOREIGN PATENTS OR APPLICATIONS

| | | | |
|---|---|---|---|
| 69,884 | 11/1969 | Germany | 264/117 |
| 857,105 | 12/1960 | United Kingdom | 106/101 |

*Primary Examiner*—Helen M. McCarthy
*Attorney, Agent, or Firm*—William L. Krayer

[57] ABSTRACT

Improved white portland cement is made by utilizing briquettes or pellets having a smallest dimension of ¼ to ¾ inch to accomplish a uniform optimum heat transfer during the quenching step.

3 Claims, 1 Drawing Figure

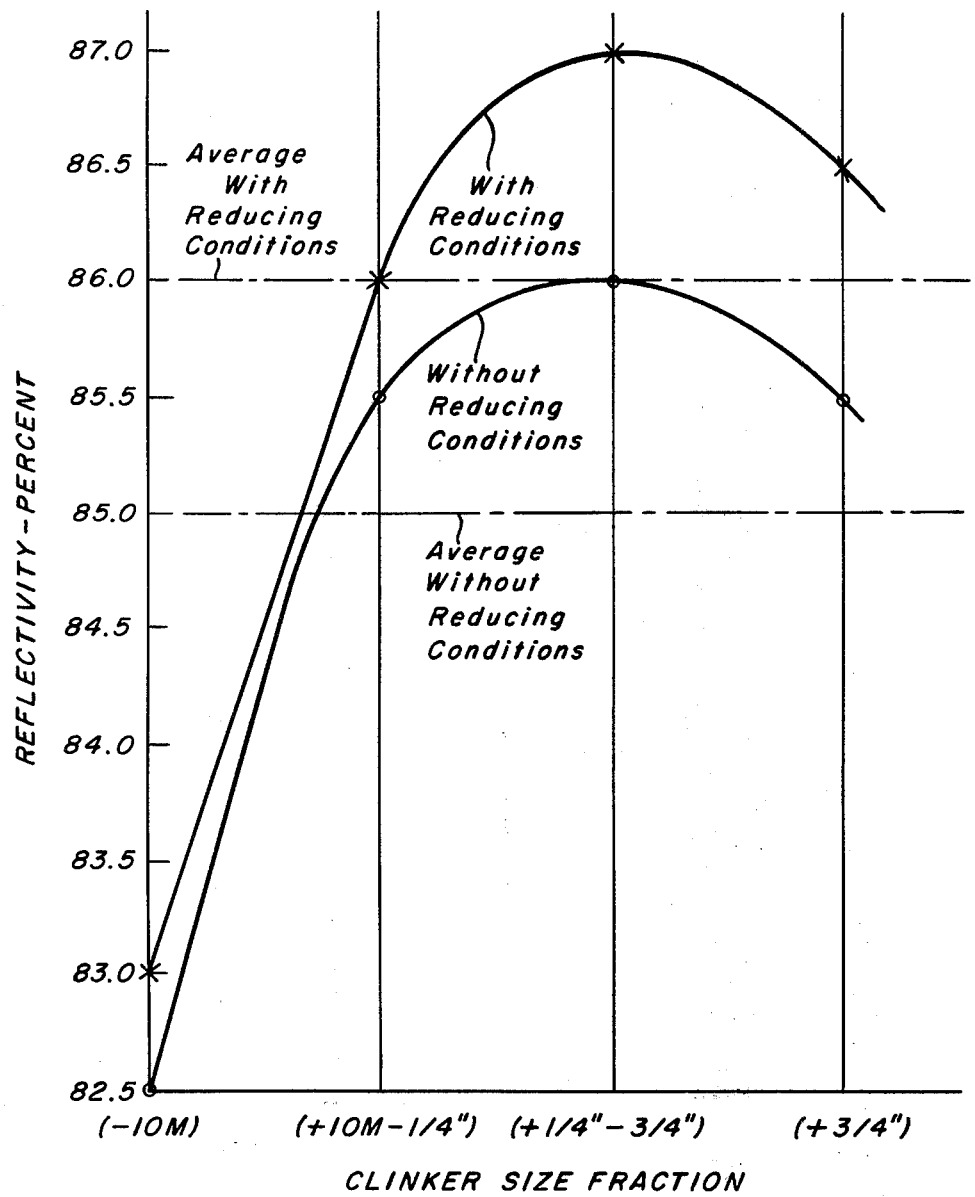

METHOD OF MANUFACTURE OF IMPROVED WHITE PORTLAND CEMENT

BACKGROUND OF THE INVENTION

The manufacture of white portland cement generally consists of carefully selecting raw materials that are otherwise conventional portland cement ingredients but very low in colorants such as iron or chromium compounds, blending said raw materials, burning them at high temperatures in a rotary kiln, and rapidly quenching the resulting clinker in the absence of air, or cooling in the presence of a reducing material such as oil, coke, natural gas. The steps of quenching and reducing may be combined.

The coloring action of the metal cations such as $Fe^{3+}$ or $Cr^{3+}$ depend upon the valence state of the cation and its coordination number in the crystals of the cement phases. High temperature (over about 1100°C) causes an increase in the coordination number of the colorant ions in the crystal lattices. The higher the temperature or the higher the concentration of reductant, such as CO or $H_2$, the more ions are aligned in the octahedral configuration. In the octahedral configuration, the polarization of the colorant ion is weakened thus decreasing the amount of adsorbed light rays and therefore increasing the amount of diffused reflected light. Thus, to the eye, the crystals, and the cement, appear whiter. The transition from a lower to a higher coordination number is enhanced by the reduction of the colorant oxide. If the material is allowed to cool slowly from the kiln temperature to a temperature between 2200°C to 1100°C or less in the presence of oxygen, the colorant will re-oxidize to some extent and re-establish itself at a lower coordination number in the crystal thus allowing more light adsorption by the colorant which will manifest itself as a more perceptible color by the eye.

If the cooling of the material can be accomplished rapidly so as to "freeze" the atoms in the lattice at the higher coordination number, by limiting the atomic amplitude in the crystal, then the colorant ion will remain at a stable valence and coordination number. Thus it is found that rapidly cooling or "quenching" the clinker material from at least 1100°C (2000°F) to below 535°C (1000°F) and preferably from about 1500°C (2730°F) to below 535°C (1000°F) in the presence of a reducing fluid or in the absence of oxygen will produce a clinker capable of being ground to a white cement. If the clinker is cooled slowly in the presence of oxygen or is cooled rapidly to a temperature above 1000°F and then cooled slowly to below 1000°F in the presence of oxygen, the clinker will be darker than desired. Therefore, it is advantageous to quench the clinker from as high as possible to below 535°C as rapidly as possible.

In accordance with the present invention, it has been observed that certain sizes of white clinker made by the above process are whiter than others. High reflectivity white portland cement is a more marketable product than darker shades of white portland cement since its "whiteness" is the characteristic sought.

Heilman, in British Pat. No. 857,105 teaches that white clinker in sizes greater than one inch should be screened out of the kiln discharge mass after quenching and, being darker, should be crushed and returned to the feed end of the kiln. However, Heilman has neither determined an optimum size of clinker nor the effect of controlling the process to achieve or utilize an optimum size related to whiteness.

SUMMARY OF THE INVENTION

I have found that not only the larger sizes of clinker are darker but also certain smaller sizes are darker and that there is an optimum size for a given processing system for the optimum reflectivity of the cement produced from the clinker. The optimum size clinker produces a cement at least 1 percentage point higher in reflectivity than the general average of all sizes ground together.

In order to accomplish optimization of clinker size as produced in a rotary white cement kiln, this invention starts with the raw materials now known to the art. These materials include limestone and clay in proportions of about 82% limestone and 18% clay, for example. Generally, my invention is useful with any standard white portland cement meal. Useful compositions include those having the following analyses and/or components:

| SPECIFIC COMPOSITION | $SiO_2$ | $Al_2O_3$ | $Fe_2O_3$ | $CaCO_3$ | $MgCO_3$ | Other |
|---|---|---|---|---|---|---|
| limestone | 1.0 | 0.47 | 0.09 | 96.6 | 0.85 | 0.99 |
| clay | 73.9 | 15.46 | 0.50 | — | — | 10.14 |

GENERAL COMPOSITION — percent by weight

| | |
|---|---|
| $SiO_2$ | 12 – 16 |
| $Al_2O_3$ | 2 – 4 |
| $Fe_2O_3$ | 0.05 – 0.2 |
| $CaCO_3$ | 78.0 – 80.5 |
| $MgCO_3$ | 0 – 3 |
| Alkalis | 0 – 0.6 |

More generally, the meal may comprise from 12 – 16% $SiO_2$, from 2–4% $Al_2O_3$, and from 78 to 80.5% $CaCO_3$. The analytical components of the general compositions herein stated may typically be derived from clay and limestone.

If the dry process is used, the dry, ground and proportioned raw materials can be further processed in the next step. If the materials are wet, the ground raw material must be dried by any means now known to the art which would include flash drying systems, spray drying systems and the like. The second step of the process is to form the dry pulverulent raw materials (raw meal) into briquettes by means of a briquetting press, a commercial example of which is one manufactured by K-G Industries. However, any briquetting machine or pelletizing machine capable of making strong, stable essentially rounded agglomerates or generally pillow-shaped briquettes as described in the next paragraph may be used. The press or pelletizer produces agglomerates whose smallest dimension is the optimum size of clinker. Since the nature of the overall kiln and quenching system will to some extent control the optimum size, the determination of the optimum size will have to be carried out by changing die rings or other parts of the briquetter to alter the size of briquettes or to change operating conditions in the pelletizer. The optimum size will, in general, be about ½" and may vary from ¼ to ¾". The largest dimension of the briquette or pellet should be no more than about 3 times the smallest.

I have found that dry cement raw meal can be briquetted from dry meal without addition of water, binders or other additives. I have further found that if the briquettes have at least 40 pounds crushing strength and have a maximum of 5% loss in a standard abrasion test, the briquettes will move through the rotary kiln essentially unchanged. I have also found that pellets from a pelletizer meeting the same criteria will perform well in the kiln. Thus, when the fully heat-treated clinker enters into the reducing and/or quenching section of the kiln system, the reducing and/or quenching process is operating on essentially all particles of optimum size relative to this portion of the process. As with more conventional processes, I may treat my specially sized clinker for a total residence time for pyroprocessing in the kiln of about 1½–2½ hours, of which generally about 15–20 minutes will be in a zone having a temperature range of 2700° – 2800°F. Since white clinker must be cooled very rapidly from kiln temperatures to below approximately 1000°F in the absence of oxygen (or in the presence of a reducing fluid), the size of the clinker has an importance in this process. If the clinker is small (under 10 mesh for instance) the surface area to mass ratio is high, and therefore a small amount of oxygen will react with the colorants throughout the clinker more rapidly than if the ratio were low. However, if the clinker is large, say over ¾'', the sensible heat within the clinker mass will remain high due to the low ratio of surface area to mass, thus allowing clinker to leave the quenching zone still above the critical temperature below which oxidation will take place, i.e. about 1000°F. The kiln temperature of about 2000°F or above should be reduced to less than 1000°F within a period of about 5 seconds to about 5 minutes.

Essentially all clinker made by my invention is at optimum size for receiving optimum and uniform quenching and/or reducing treatment.

FIG. 1 is a graphic representation of the relation of whiteness (reflectivity) to size of clinker. The size was measured by screening. Reflectivity is measured as the green portion of the tristimulus system as compared to a standard of magnesium carbonate. Readings are taken on a photovolt meter.

As an additional benefit, it has been found that the rotary kiln is more efficient in heat transfer when sized pelletized or briquetted feed is used.

It should be noted that, although I prefer the use of a briquetting press, other methods of agglomeration and size control can be used such as disc or drum pelletizing in conjunction with a screen; extruders, pellet mills and the like can also be used. However, these methods require large amounts of cementitious binder, and subsequent curing and drying treatment to produce an agglomerate that will meet the strength and abrasion specifications is necessary.

The standard abrasion test referred to herein is a modification of ASTM E 279-65T, wherein 200 g of pellets are charged into a closed, horizontally disposed wire mesh cylinder having ⅜ inch square openings. The cylinder is then rotated on its horizontal axis at 60 rpm for 15 minutes, the charge of pellets remaining is weighed, and the percent lost is calculated as the abrasion loss. I prefer an abrasion loss of no more than 2%.

My invention is not restricted to the particular examples and illustrations herein. It may be otherwise variously practiced within the scope of the following claims.

I claim:

1. Method of making white portland cement comprising forming dry white portland cement meal into generally pillow-shaped briquettes or pellets whose smallest dimension is from ¼ to ¾ inch having at least 40 pounds crushing strength and no more than 5% loss in the standard tumbler abrasion test, and whose largest dimension is no more than about three times the smallest dimension, passing the briquettes through a rotary kiln having a pyroprocessing zone reaching a temperature of 2700°F to 2800°F and quenching the briquettes to reduce their temperature from a kiln temperature of from about 2000°F or higher to a quench temperature of less than 1000°F in a period of from 5 seconds to 5 minutes in the presence of a reducing fluid or in the absence of oxygen.

2. Method of claim 1 in which the meal comprises by weight from 12% to 16% $SiO_2$, from 2% to 4% $Al_2O_3$, and from 78.0% to 80.5% $CaCO_3$.

3. Method of claim 1 in which the briquettes are made from the dry meal on a tandem roll compression briquetting machine.

* * * * *